United States Patent [19]

Swan, Jr.

[11] Patent Number: 5,396,709

[45] Date of Patent: Mar. 14, 1995

[54] METHOD AND APPARATUS FOR PRECISE CALIBRATION OF MAGNETIC COMPASS AND PREPARATION OF DEVIATION TABLES

[76] Inventor: David S. Swan, Jr., 1419 Leo La., Apt. 2, Clearwater, Fla. 34615

[21] Appl. No.: 643

[22] Filed: Jan. 5, 1993

[51] Int. Cl.6 ............................................. G01C 17/38
[52] U.S. Cl. ..................................... 33/268; 33/356
[58] Field of Search ............... 33/227, 268, 269, 270, 33/271, 272, 343, 351, 352, 356

[56] References Cited

U.S. PATENT DOCUMENTS

| | | | |
|---|---|---|---|
| 538,889 | 5/1895 | Arvidson | 33/269 |
| 628,600 | 7/1899 | Fields | 33/268 |
| 629,757 | 7/1899 | Christensen | 33/356 |
| 686,127 | 11/1901 | Potter | 33/269 |
| 961,862 | 6/1910 | Huntington | 33/268 |
| 1,130,625 | 3/1915 | Peck | 33/268 |
| 1,188,522 | 6/1916 | Woodward | 33/271 |
| 1,218,422 | 3/1917 | Lietz | 33/272 |
| 2,839,833 | 6/1958 | Haoner | 33/268 |

FOREIGN PATENT DOCUMENTS

| | | | |
|---|---|---|---|
| 2554920 | 5/1985 | France | 33/268 |
| 3991 | of 1876 | United Kingdom | 33/268 |
| 933 | of 1882 | United Kingdom | 33/268 |

Primary Examiner—Thomas B. Will
Attorney, Agent, or Firm—Charles E. Lykes, Jr.

[57] ABSTRACT

An apparatus and method for compensating for the measured variation in bearing between magnetic north as read on a compass and true north as may be determined by juxtaposition with the sun at a given time. Such apparatus and method is particularly useful in vessels or other environments in which there are either or both disturbances in the natural magnetic flux pattern of the earth and natural variations between natural magnetic and true north.

18 Claims, 4 Drawing Sheets

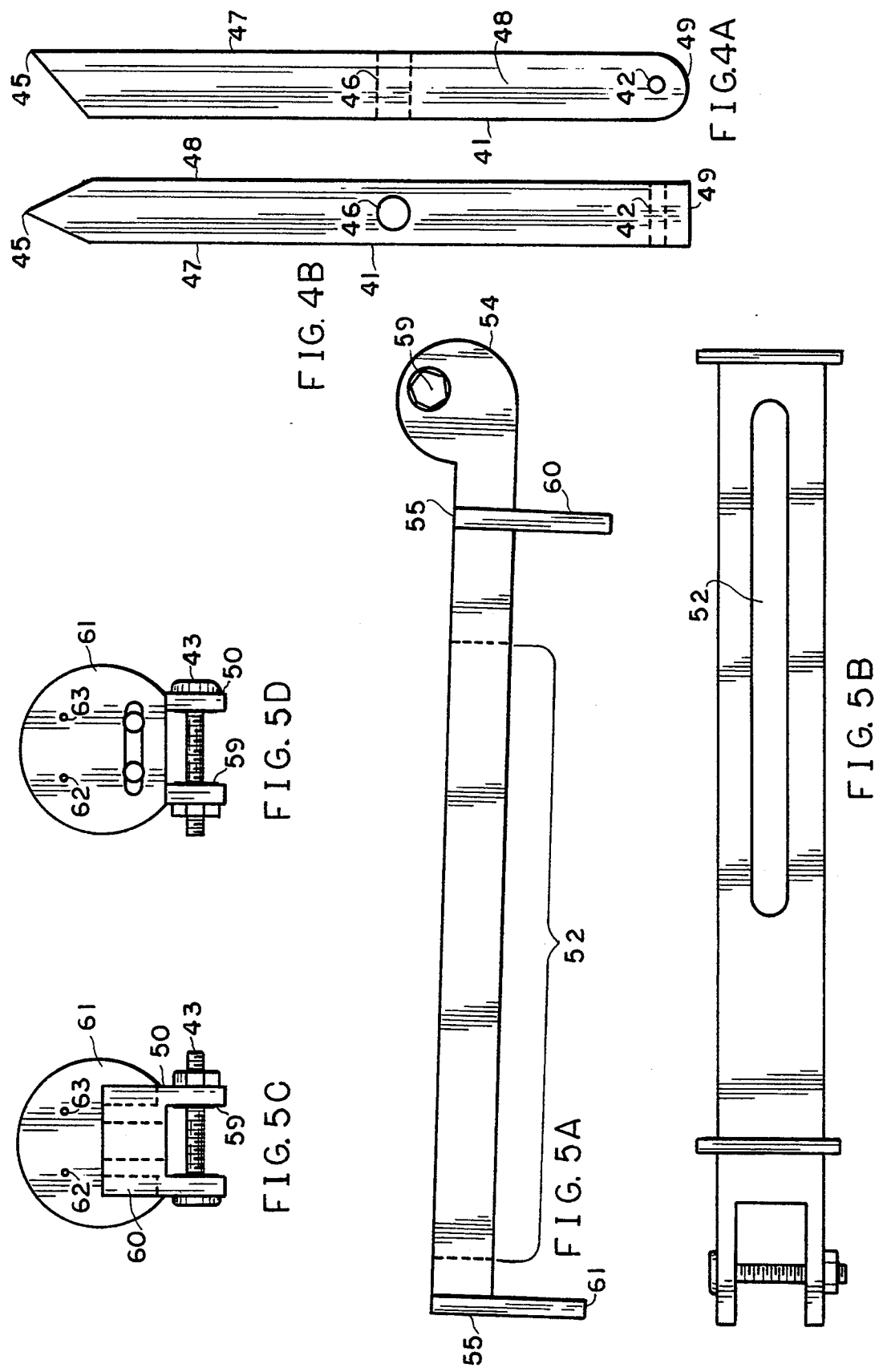

METHOD AND APPARATUS FOR PRECISE CALIBRATION OF MAGNETIC COMPASS AND PREPARATION OF DEVIATION TABLES

The invention relates to navigational devices, particularly those designed for marine use which utilize a magnetic compass. Reference is made to the disclosure document filed by the inventor on Jan. 14, 1992, which describes the invention herein.

BACKGROUND OF THE INVENTION

For the purpose of this invention, it will be assumed that the technology of a magnetic compass is well known. The magnetic compass has long been used by navigators to help find direction for steering a vessel. The natural magnetic field of the earth is aligned between the north and south poles closely enough that we have adopted the conventional terms of "magnetic north" and "magnetic south". In reality, however, there is usually some "variation" between true north and south and so-called "magnetic north" and "magnetic south", the latter two terms referring to the directions provided by the needle or orientation of a standard magnetic compass. This "variation" will, at some points on the globe, be minimal. At other points on the globe, however, this "variation" will be quite substantial. A good discussion of magnetic compass navigation is provided in *Chapman Piloting*, 56th Edition, 1983. The terms described therein, such as "variation" and "deviation" will be adopted for use in this application. What is important to note for the purpose of this discussion is that the relationship between true north and magnetic north is readily ascertainable from geographical and navigational charts and maps.

The earth's natural magnetic field is strong enough to be found at virtually any point on the earth's surface, but is significantly weak to be subject to attenuation by the immediate surroundings of a compass needle, such as metallic objects and electrical currents and conductors. These objects have the effect of disturbing the orientation and intensity of the earth's natural magnetic field. They may cause the magnetic compass reading to be inaccurate. The fluctuations in the reading of a compass needle caused by these fluctuations is called "deviation".

The construction of water vessels, including small pleasure craft with fiberglass hulls, includes a variety of metal components. In particular, it may be said and accepted as well-known, that each vessel has its own unique configuration of such magnetic field disturbances, such as anchor mechanism, radio antenna and sail masts, engine and controls, and appliance and electrical power supply. It may also be said that, once installed, these items are likely to remain in the same configuration for some substantial time, and almost always for the length of a given voyage. (The sail spars will necessarily be moved quite radically to accomplish steering the vessel. When the sail spars are of a magnetic flux material, special consideration must be given to the methods and apparatus described herein which are beyond the scope of this application.)

The combination of metal and electrical components will cause each vessel, including those which are otherwise identical, to have a different electromagnetic flux pattern. For simplicity, this will be referred to as the vessels "electromagnetic signature." Accordingly, the electromagnetic signature of each vessel will cause it to exhibit its own unique relationship between the vessel's actual bearing and that indicated by an on-board magnetic compass.

These variances and deviations will normally be sufficient to adversely affect precise navigation by magnetic azimuth. An error of only five degrees (1/72 of a circle), when maintained over an eleven mile run, will result in a navigator being a full mile off the intended course.

It is generally possible to ascertain the "true bearing" to the sun from any known point on the globe at a given time. Additionally, there is a mathematical formula, called the "Dozier Formula" which enables this direction to be calculated, provided that a person knows their precise coordinates and the precise time. The "Dozier Formula" is:

$\tan(T-180) = \sin \text{LHA}/(\cos \text{LHA} \sin L + \cos L \tan d)$ where "T" is the true bearing to the sun, "LHA" refers to the "local hour angle" which is Greenwich mean time plus or minus four minutes for each degree of longitude from the Greenwich meridian, "L" is the latitude, and "d" is the declination angle. It should be noted that while it is true that modern vessels are equipped with sophisticated navigational aids, such as the LORAN (R), it is desirable to have a reliably accurate backup system. There are also those boaters who might find such magnetic navigation either personally preferable or recreational satisfying.

Magnetic compasses, particularly those used for navigation, frequently have adjusting, or compensation, screws. These can be used in order to make a one-time compensation with a compass. Such an adjustment will not, however, be able to account for the deviations to the magnetic reading as a result of the vessel's "electromagnetic signature".

Several devices have been taught in the art to assist with precise navigation using a magnetic compass. Such devices normally include some means of determining a precise direction based upon a known direction to the sun, moon, or other known object.

For instance, U.S. Pat. No. 1,034,767, issued to *Cheifetz*, Aug. 6, 1912, teaches an apparatus which, by measuring and plotting the angles of shadows from both the sun and the moon, enables a navigator to accurately determine latitude.

Another such device is taught by U.S. Pat. No. 1,570,349, issued to *Hollinwood*, Jan. 19, 1926. *Hollinwood* teaches an apparatus which may be used either as a sundial or as a sighting device for a magnetic compass. When used as a sundial, the apparatus depends upon the accuracy of the magnetic direction reading and the sundial face may be tilted to enhance the accuracy of the device.

During recent years, however, the inventive emphasis has been on developing radar and satellite systems to provide precise digital readings of position and direction (along with depth and the location of fish and surface obstacles). It should be noted that modern timekeeping instruments have developed so that relatively inexpensive quartz watches may be relied upon to provide a very precise time. It is also possible to acquire or produce charts which, as a function of date and position, provide accurate information relating such events as sunrise, sunset, and noon meridian to global position or otherwise predict precise solar orientation. Accordingly, it should be possible to develop means and method for refining the accuracy of readings from more traditional magnetic compass instruments.

SUMMARY OF THE INVENTION

The inventor has developed an apparatus and method for accomplishing this task. The accuracy and reliability of the device is facilitated by the accessibility of a precise time, either through shortwave radio or modern quartz time pieces which achieve a high degree of accuracy, or both. The inventor has developed an apparatus which, by precise knowledge of the time and use of known solar tables, enables a sailor to obtain an exact bearing at any time of day when the sun is visible. By taking a variety of such readings throughout the full rotation of a vessel and plotting them against the magnetic bearing read at the same for the same orientation, it is possible to create a graph or chart which can be read to immediately provide an accurate reading of true bearing based upon the magnetic bearing yielded by the calibrated and compensated compass.

The apparatus generally comprises a reliable magnetic compass which may also be adjusted and a solar orientation rose apparatus. The solar orientation rose apparatus should be equipped with a permanent index which corresponds with the vessel's due forward and be calibrated in 360 degrees or other radial scale equivalent to the magnetic compass. The solar orientation rose apparatus should also have an arm which may rotate about the rose which is further adapted for precise solar orientation. It is also necessary to have an accurate timepiece and means of precisely calibrating it with Greenwich Mean Time. It is also necessary to have charts or other data enabling a person to precisely determine direction to the sun from a given point on the globe and it is useful to have precise knowledge of the magnetic variations.

In practice, the true orientation of a vessel can, with precise knowledge of the time, be calculated during hours of daylight. This is done by lining the rose arm with the sun and rotating the rose. This "true bearing" given by the reading at the index line can then be compared and plotted against the magnetic reading. If knowledge of the magnetic variations is known at the time of taking the plot (and it is readily available on typical navigation charts), then a single plot will enable a sailor to navigate from the compass as long as the electromagnetic signature remains the same.

If the magnetic variation is not available, then a plot may be made of true north directly against the vessel's magnetic bearing. While this latter method may be used in some circumstances, it should be noted that its reliability will be limited to a relatively small distance from where the initial plot is made.

It is, therefore, an object of the present invention to provide a navigational device which enables a navigator to precisely navigate based upon the readings of a magnetic compass.

It is a further object of the present invention to provide a means of calibration of such a navigational device in order to permit the use of such device across a variety of locations on the globe when the relationship between magnetic north and true north is unknown.

It is a further object of the present invention to provide a means and apparatus for such precise navigation which may be adapted and calibrated for use upon any given vessel and not adversely affected by such vessel's electromagnetic signature.

It is a further object of the present invention to provide a method for navigating a vessel precisely with a magnetic compass when the precise time is known and when the relationship between true north and magnetic north is known.

It is a further object of the present invention to provide a method for navigating a vessel precisely with a magnetic compass throughout a particular area when the relationship between true north and magnetic north is not known.

Other features and advantages of the present invention will be apparent from the following description in which the preferred embodiments have been set forth in conjunction with the accompanying drawings.

BRIEF DESCRIPTION OF THE DRAWINGS

In describing the preferred embodiment of the present invention, reference will be made to the accompanying drawings, which are briefly described herein.

FIGS. 4a and 4b depict the pointing arm which rotates about the solar compass from different perspectives.

FIGS. 5a, 5b, 5c, and 5d depict the solar aiming arm from various perspectives.

DETAILED DESCRIPTION OF THE PREFERRED EMBODIMENT

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

The invention teaches an apparatus and method which is primarily useful in navigating a water vessel. It is presumed that such vessel is equipped with a mounted magnetic compass, which is well known in the art and not separately described here. Many such magnetic compasses are equipped with adjusting screw enabling an internal calibration as set out in the *Chapman* article, supra. Such calibration should be accomplished prior to undertaking the procedures taught herein.

Figure 1:
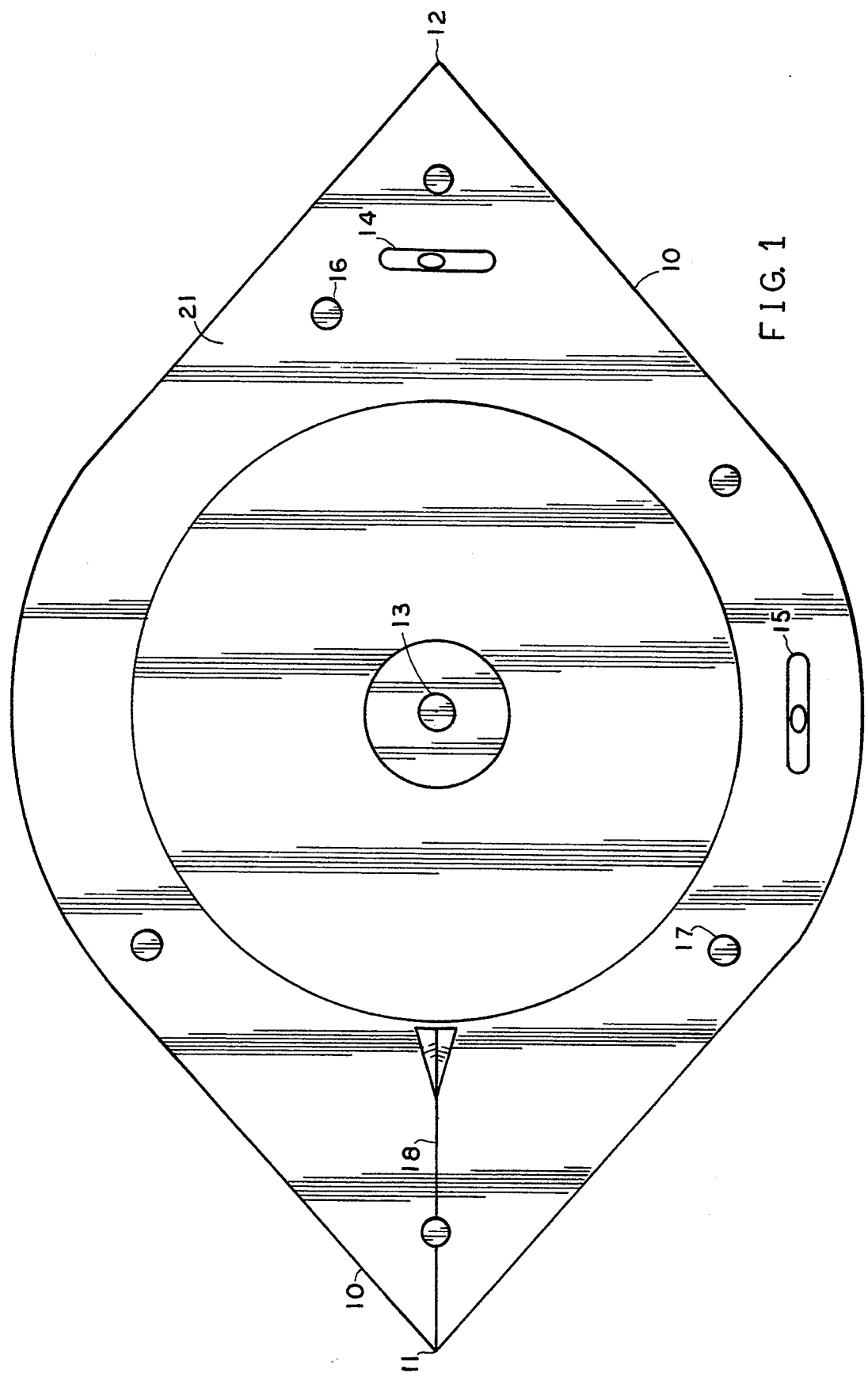
FIG. 1 depicts the solar orientation rose and its main components.

Making reference first to FIG. 1, elevational view of the solar compass rose base (10) is shown. The apparatus may, but need not, be made in a substantially ovular shape with ends (11, 12). Such shape would facilitate aligning the device with the orientation of a vessel. At its center is provided a hole (13) to receive the axis of compass rose (not depicted in FIG. 1). An index line (18) passing through the hole (13) and running either along or parallel to the true bearing of the vessel is on the face (21) of the rose base (10). Also, on the base are at least two leveling bubbles (14, 15). Also, leveling bubbles (14, 15) should be oriented perpendicularly to one another in order to allow leveling in both dimensions of the plane of the base (10). Two or more leveling screws (16, 17) are provided to facilitate the leveling function.

Figure 2:
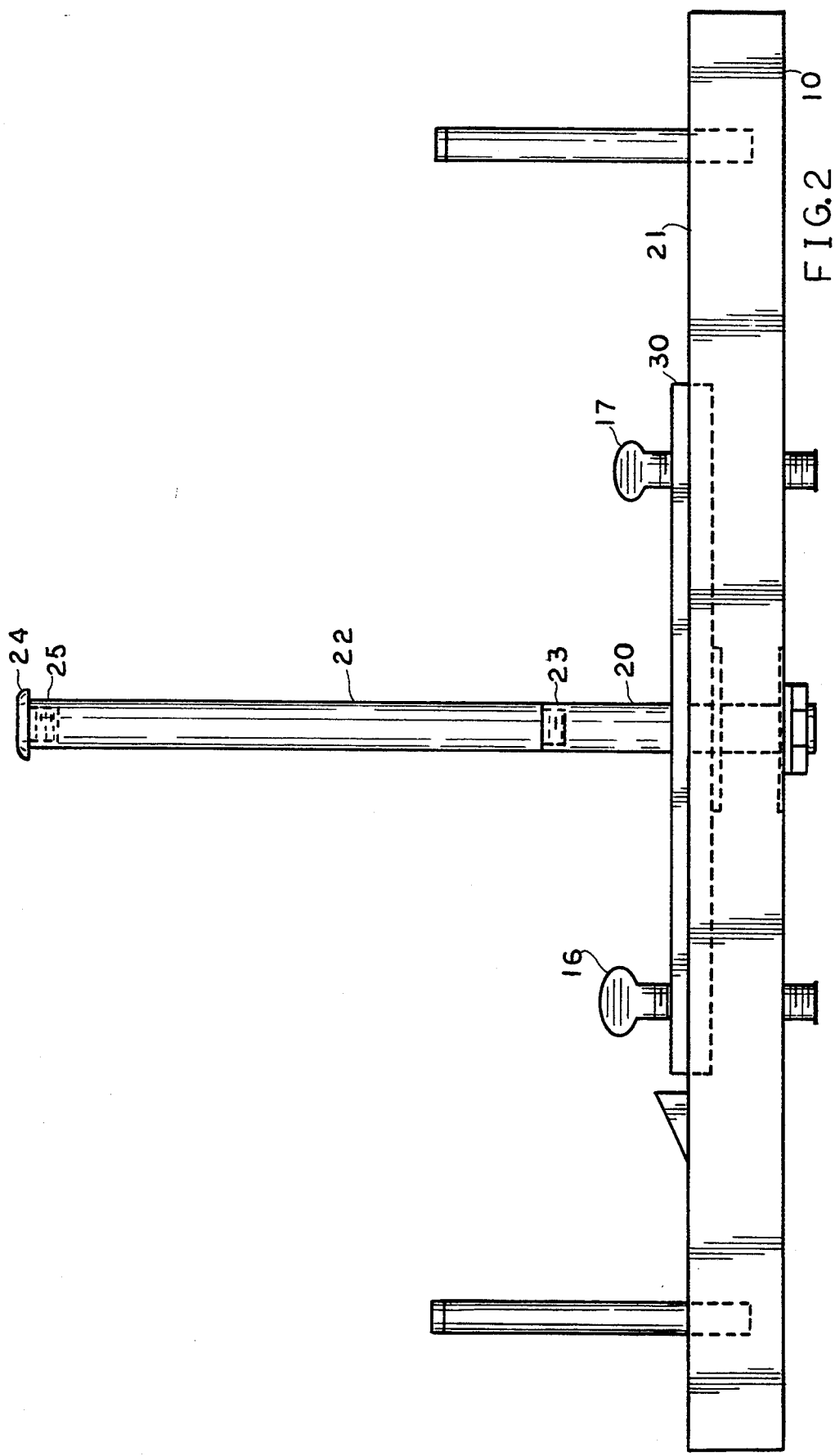
FIG. 2 depicts a side view of the solar compass rose base.

Making reference now to FIG. 2, the base (10) is depicted with a compass rose (30) and center bolt (20). The compass rose (30) is free to rotate about the center bolt (20) on the face (21) of the base (10). It can also be seen from FIG. 2 that the center bolt (20) may, but need not, be lengthened with an elongated extension (22) which can be turned into the center bolt (20) through threads (23) and either the center bolt (20) or the elongated extension (22) may, but need not, receive a cap member (24) which can be turned into either piece through threads (23 or 25).

Figure 3:
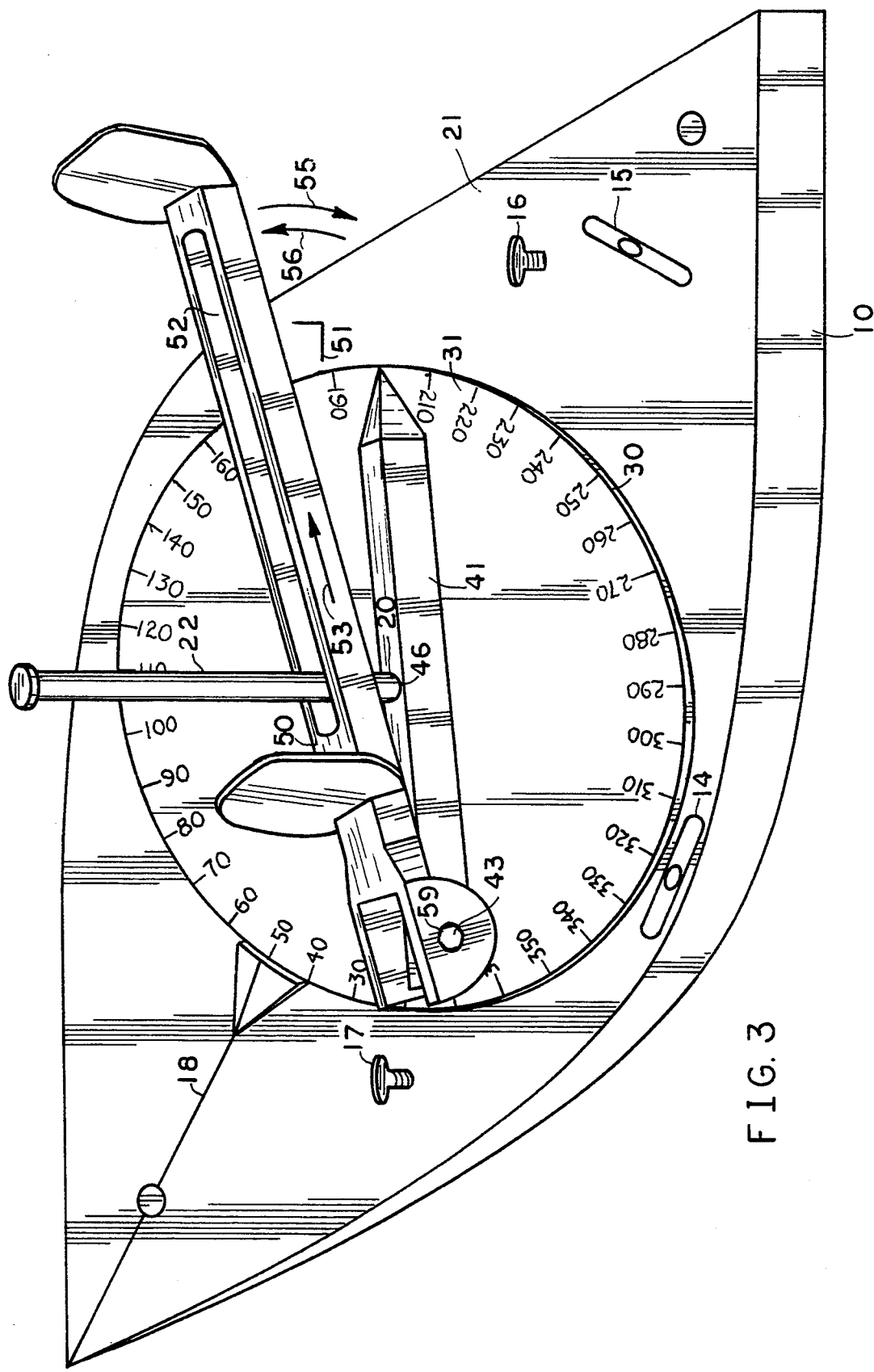
FIG. 3 depicts the solar compass rose apparatus with all major components.

Making reference now to FIG. 3, it can be seen how these and other major components of the apparatus are assembled together. The compass rose (30) is positioned upon the face (21) of the base member (10) about the center bolt (20). The compass rose (30) can be rotated, but the force of friction will normally keep the rose (30) and face (21) in the same position relative to each other. A navigator may easily adjust this relationship by rotating the rose (30). The face (31) of the compass rose (30) is radially calibrated about its circumference. Depicted is a calibration in 360 degrees, but radians or mils could be used if desired.

Resting upon the rose face (31) is a pointing arm (41) upon which is pivotally mounted an aiming arm (50) by means of a hinge (43) through a hole (59) in the aiming arm (50) and a hole in the pointing arm (not visible in FIG. 3 but depicted in FIGS. 4a and 4b). The pointing arm (41) is adapted with a hole (46) to snugly accommodate the center bolt (20) so that the pointing arm (41) can be precisely rotated about the center bolt (20).

The aiming arm (50) is adapted to pivot about the hinge (43) such that one axis (51) of its direction vector will be parallel with the direction of the pointing arm (41). A slot (52) runs along the length (53) of the aiming arm (50) which will allow the center bolt (20) and any extension (22) to fit within the slot (52) as the aiming arm (50) is pivoted from a position (55) nearly parallel to the pointing arm (41) to a position at a significant angle (56) with the pointing arm (41).

FIG. 4a depicts the pointing arm (41) with a bottom side (44) which rests against the rose face (31). The pointing arm hinge hole (42) can be seen at one end (49), and the other end comes to a tapered point (45) against the rose face (31). The position of the center bolt hole (46) is shown by dotted lines in FIG. 4a. FIG. 4b is an elevational view of the pointing arm (41). The position of the pointing arm hinge hole (42) is shown with dotted lines in FIG. 4b. From the elevational view, it can be seen that the tapered point (45) is centered between the horizontal sides (47, 48) of the pointing arm (41).

FIGS. 5a, 5b, 5c, and 5d depict a means of constructing the aiming arm (50). FIG. 5a is a side view which depicts the aiming arm hinge hole (59). The dotted lines of FIG. 5a depict the ends of the position of the slot (52). Near the aiming arm hinge end (54) can be seen slots (55) to receive a sun target (60). At the aiming end (55) may be mounted a sunlight receiving plate (61) which is further adapted with one or more pin holes (62, 63).

It should be noted that, however the aiming and pointing arms are connected, they should be adapted to rotate together so that they point in precisely the same direction. While a hinged joint has been described, other methods may be used in keeping with the spirit and scope of the present invention.

The base member is first leveled by adjusting the leveling screws (16, 17) until the leveling bubbles (14, 15) each read level. Then the aiming arm (50) may be precisely directed at the sun by rotating the arms (41, 50) together about the center bolt (20) and pivoting the aiming arm (50) until the sunlight coming through the pinholes (62, 63) can be seen in the proper position on the sun target (60). The precise angular orientation of the direction to the sun may then be set for a particular orientation of the compass rose (30) on the face of the base member (21).

In practice the first task is to properly orient the compensation apparatus with the alignment of the vessel. It should be noted that the rose has been mounted upon a base which is pointed at the apexes of the oblong. These apexes can be used to define a line congruent or parallel with the center line of the vessel. Of course, it should also be noted that the base could be of any shape, as long as some means of alignment and stability with the center line of the vessel is provided. The base member is then leveled by adjusting the leveling screws (16, 17) until the leveling bubbles (14, 15) each read level.

The aiming arm (50) may now be precisely directed at the sun by rotating the arms (41, 50) together about the center bolt (20) and pivoting the aiming arm (50) until the sunlight coming through the pinholes (62, 63) can be seen in the proper position on the sun target (60). The next task becomes that of orienting the rose with the true orientation of the vessel. This is accomplished by aiming the aiming arm directly at the sun and then rotating the rose to the reading corresponding with the known direction of the sun at a given time.

Having determined the proper direction of the sun at the precise time of measurement and having directed the aiming arm precisely at the sun, the compass rose may be rotated so that the reading arm pointer is directed at this solar angle. The index line on the mounting plate will now yield the true bearing of the vessel. Also, at this precise moment, the magnetic compass reading may be taken. It should be noted that a magnetic compass with internal calibration or compensation apparatus should be so adjusted prior to undertaking this task.

What is critical here is that, with precise knowledge of the time and solar orientation, it is possible to rotate the vessel about an entire circle and take readings of the true (solar calculated) orientation and magnetic bearing at given intervals of vessel orientation (10 degrees, for instance). As a result of these readings, a plot may be made of true direction versus magnetic orientation which will enable a navigator to prepare a compass deviation table.

It should also be pointed out that this relationship can be used in related, but different, methods in order to achieve the ultimate goal of navigating a vessel most efficiently. Keeping in mind that the relationship between true and magnetic north will normally be known, it can be seen that the relationship between the magnetic reading of the vessel's compass (as altered by the vessel's magnetic signature) and magnetic north may be ascertained. Having once made this plot, a navigator may reliably navigate anywhere as long as the relationship between true and magnetic north is known by making the simple mathematical addition or subtraction necessary to account for this variation.

It is also possible, however, to use the plot of the vessel's compass bearing directly against the solar calculation of true north within a limited distance and time of having made the calibration as described above. It should be noted that the relationship between true and magnetic north varies both in time and position. Accordingly, such a calibration should be repeated in a different area or after more than a year has passed. The advantage of this method, within these constraints, is that it does not require further mathematical calculation following the examination of the vessel compass versus true north plot.

It should be pointed out that a number of configurations of solar aiming arm and orientation apparatus could be developed in keeping with the spirit and scope of the invention. For instance, such apparatus could originate at the bolt axle and comprise arms of unequal length.

Modification and variation can be made to the disclosed embodiments without departing from the subject and spirit of the invention as defined in the following claims. Such modifications and variations, as included within the scope of these claims, are meant to be considered part of the invention as described.

What is claimed is:

1. An apparatus for compensating for deviations between the reading of a magnetic compass and the true bearing of a vessel, the apparatus comprising:

a mounting plate for a compass rose, said mounting plate having an index line which is congruent with or parallel to the center line of said vessel and means for leveling said mounting plate to provide a level surface for a compass rose and an axle for a compass rose along said index line;

a compass rose whose center is at said axle and which is calibrated in units the same or readily convertible to the units of a magnetic compass to be compensated, said rose further being capable of alternately being rotated or fixed in position about said axle; and solar aiming means, said solar aiming means providing means for precise alignment of an index about said axle as necessary to precisely fix the position of the sun at a given time, said solar aiming means further comprising a reading arm which may be rotated about said axle and which comes to a point upon said compass rose calibration, and a solar aiming arm, said solar aiming arm being mounted or attached to said reading arm so that said solar aiming arm may be rotated both in a plane which is perpendicular to said rose from a hinge upon said reading arm at or near the opposite reading arm end from said point and includes the line from the compass rose center and said reading arm point and also may be rotated together with said reading arm about said axle until said solar aiming arm is pointed directly at a target, such as the sun.

2. The compass compensation apparatus described in claim 1, in which said solar aiming arm further comprises an aiming plate near the forward end of said solar aiming arm, said aiming plate being opaque and adapted with one or more small holes to allow the passage of light parallel to the length of said arm and a target plate, said target plate being mounted near the rear end of said solar aiming arm and defining a plane generally perpendicular to said solar aiming arm and of a shade such that a beam of solar light passing through one of said aiming plate small holes can be seen upon the surface of said target plate.

3. The apparatus described in claim 2 in which said solar aiming arm is pivotally mounted to said reading arm at a point opposite said reading arm point from said axle and in which said solar aiming arm is adapted with a slot within which said axle may be passed throughout a range of rotation of said solar aiming arm sufficient to permit it to be precisely aimed at the sun, said small holes being positioned upon said aiming plate so that said passing light beams may pass on one side or the other of said axle before striking said target plate.

4. The apparatus described in claim 1 in which said mounting plate leveling means further comprises two or more leveling bubbles, each of which are parallel to said mounting plate and perpendicular to each other and lockable adjusting means so that said mounting plate may be adjusted and then locked in a position as determined to be level with the surface of the earth.

5. The apparatus described in claim 2 in which said mounting plate leveling means further comprises two or more leveling bubbles, each of which are parallel to said mounting plate and perpendicular to each other and lockable adjusting means so that said mounting plate may be adjusted and then locked in a position as determined to be level with the surface of the earth.

6. The apparatus described in claim 3 in which said mounting plate leveling means further comprises two or more leveling bubbles, each of which are parallel to said mounting plate and perpendicular to each other and lockable adjusting means so that said mounting plate may be adjusted and then locked in a position as determined to be level with the surface of the earth.

7. The compass compensation apparatus described in claim 1 in which said compass compensation apparatus further comprises a timepiece which is accurate and consistent.

8. The compass compensation apparatus described in claim 2 in which said compass compensation apparatus further comprises a timepiece which is accurate and consistent.

9. The compass compensation apparatus described in claim 3 in which said compass compensation apparatus further comprises a timepiece which is accurate and consistent.

10. The compass compensation apparatus described in claim 4 in which said compass compensation apparatus further comprises a timepiece which is accurate and consistent.

11. The compass compensation apparatus described in claim 5 in which said compass compensation apparatus further comprises a timepiece which is accurate and consistent.

12. The compass compensation apparatus described in claim 6 in which said compass compensation apparatus further comprises a timepiece which is accurate and consistent.

13. The compass compensation apparatus described in claim 1 in which said compass compensation apparatus further comprises a timepiece which is accurate and consistent and reference charts which accurately provide the orientation of the sun with respect to a given point on the earth at a given time.

14. The compass compensation apparatus described in claim 2 in which said compass compensation apparatus further comprises a timepiece which is accurate and consistent and reference charts which accurately provide the orientation of the sun with respect to a given point on the earth at a given time.

15. The compass compensation apparatus described in claim 3 in which said compass compensation apparatus further comprises a timepiece which is accurate and consistent and reference charts which accurately provide the orientation of the sun with respect to a given point on the earth at a given time.

16. The compass compensation apparatus described in claim 4 in which said compass compensation apparatus further comprises a timepiece which is accurate and consistent and reference charts which accurately provide the orientation of the sun with respect to a given point on the earth at a given time.

17. The compass compensation apparatus described in claim 5 in which said compass compensation apparatus further comprises a timepiece which is accurate and consistent and reference charts which accurately provide the orientation of the sun with respect to a given point on the earth at a given time.

18. The compass compensation apparatus described in claim 6 in which said compass compensation apparatus further comprises a timepiece which is accurate and consistent and reference charts which accurately provide the orientation of the sun with respect to a given point on the earth at a given time.

* * * * *